62

No. 11,823. Reissued Apr. 24, 1900.

H. Q. PLUMMER.

BICYCLE PEDAL BELL.

(Application filed Dec. 29, 1899.)

WITNESSES:

G. H. Blake

M. C. Buck

INVENTOR.

Horace Q. Plummer

BY V. H. Lockwood

His ATTORNEY.

THE NORRIS PETERS CO., PHOTO-LITHO., WASHINGTON, D. C.

UNITED STATES PATENT OFFICE.

HORACE Q. PLUMMER, OF DANVILLE, INDIANA, ASSIGNOR, BY DIRECT AND MESNE ASSIGNMENTS, TO HENRY T. HEARSEY, OF INDIANAPOLIS, INDIANA.

BICYCLE-PEDAL BELL.

SPECIFICATION forming part of Reissued Letters Patent No. 11,823, dated April 24, 1900.

Original No. 632,471, dated September 5, 1899. Application for reissue filed December 29, 1899. Serial No. 742,018.

*To all whom it may concern:*

Be it known that I, HORACE Q. PLUMMER, a citizen of the United States, residing at and whose post-office address is Danville, in the county of Hendricks, State of Indiana, have invented a certain new and useful Bicycle-Pedal Bell; and I do hereby declare that the following is a full, clear, and exact description thereof, reference being had to the accompanying drawings, in which like letters and figures refer to like parts.

The invention relates to a bell or gong that is adapted to be applied to and operated in connection with the pedals of bicycles.

Broadly speaking, it consists of a base-plate secured to the pedal-frame, with a bell plate or lever pivoted to the base-plate that can be actuated by the foot, and a bell-clapper pivoted on said bell plate or lever, so that it will ring the bell when operated and is caused to operate by being moved into engagement with the striker through a movement of the base plate or lever by the foot.

Specifically, it consists in a new and novel frame and operating means therefor whereby the bell may be placed in an operative position, means whereby the bell is retained in its inoperative position, and in means whereby the bell is caused to sound strongly and also with little force; and it consists, further, of the parts and arrangement hereinafter fully described and claimed.

The objects of my invention are, first, to provide a bell which may be sounded when the bicycle is in motion only and without requiring the use of the hands, which are usually otherwise employed; second, to produce such bell with the least amount of weight in its construction; third, to provide a simple and therefore cheap device of this character, and, fourth, to generally improve the details of construction so as to be durable and economical in use.

The full nature of my invention will be understood from the accompanying drawings and the description following of one form of device embodying said invention, and the scope of said invention will be understood from the claims following said description.

Figure 1:
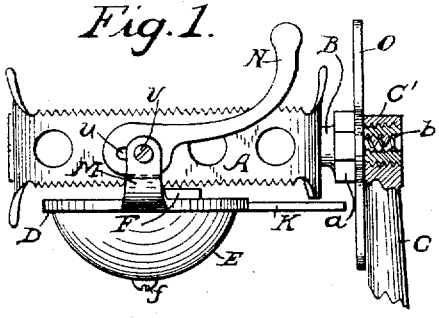
Figure 2:
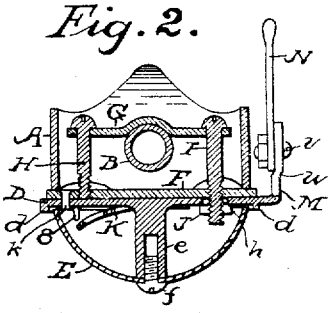
Figure 3:
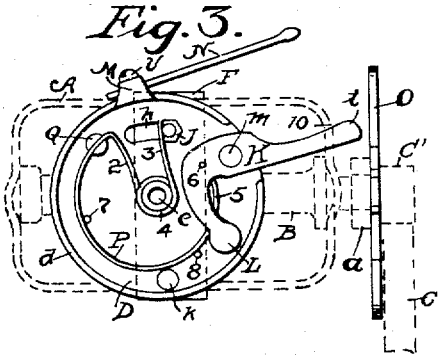
Figure 4:
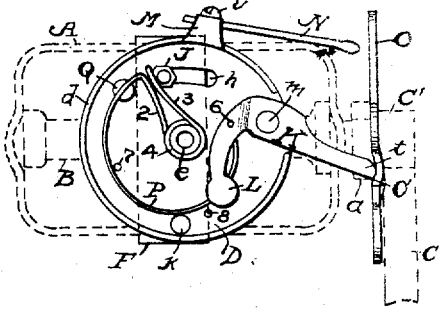
Figure 5:
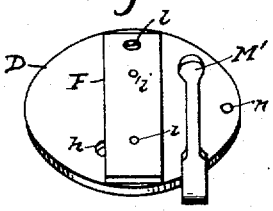
Figure 6:
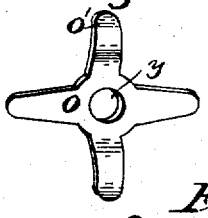
Figure 7:
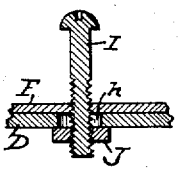
Figure 8:
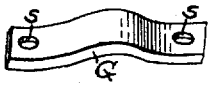
Figure 9:
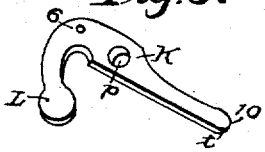

In the drawings, Figure 1 is a front elevation of the bell duly mounted. Fig. 2 is a central vertical cross-section thereof. Fig. 3 is a bottom view thereof with the bell or gong removed and the parts inoperative. Fig. 4 is the same with the parts in operation. Fig. 5 is an upper perspective of the bell frame or lever, showing the extension for actuation by the foot integral therewith. Fig. 6 is a perspective of the striker, and Figs. 7, 8, and 9 are detail views.

In practically carrying out my invention a metallic base-plate F is provided, which is adapted to fit the pedal-frame A of a bicycle, and it may be of any suitable width. It is preferably designed to bear against the pedal surface or part against which the foot bears and secured thereto, as in the present case, by means of a clamp G, extending over the opposite side of the hub B, and screw-bolts H I, extending through perforations *s s* in the clamp and threaded perforations *i i* in the base F.

A bell frame or lever D is either made of cast metal or stamped out of sheet metal and may be of any form, but is preferably circular, having a flange *d*, adapted to extend over the edge of the bell E as a protection both against injury and against mud and dust. The frame or lever is pivoted at one side to the base by means of a rivet *k* in a perforation in the frame or lever and a registering perforation *l* in the base. At the opposite side and registering with a perforation *i* is a slot *h* to receive the extended threaded end of the bolt I, which projects below the frame-plate or lever and is provided with a nut J, which after being adjusted may be suitably locked, but without binding the frame-plate or lever tightly, the frame or lever being permitted to move laterally about its pivot *k* and being governed in extent of movement by the ends of the slot *h* acting as stops against the bolt I. The frame or lever has a center stud *e*, to which the bell is suitably secured, as by a screw *f*, and at the under side as it hangs below the pedal it has posts 7 and 8 and a split post Q, and near the edge, opposite the latter, is a perforation *n*, in which is a pivot *m*, by which the clapper K, having an axial hole *p*, is mounted at the under side of the frame or lever. The clapper has a curved inner end, terminating in a clapper L of suitable form, and an outer end *t*, adapted to form contact with the strikers O and O′, or, if desired, with the arm C of the bicycle-crank. A perforation 6 is adapted to receive the operating-spring. The operating-spring P is formed of wire and is preferably continuous, so that one spring not only retains the bell in its inoperative position, but also acts to throw the clapper against the bell. Thus adapted it comprises an elliptically-curved main section secured in the split post Q, extending outside the post 7 and inside the post 8 and having its free end hooked in the perforation 6 of the lever K or otherwise connected thereto. From the post Q a section 2 extends to and coils about the stud *e*, as section 4, extending thence, as section 3, the free end of which bears against the side of the lower end of the bolt I, immediately below the nut J, and may serve as a lock therefor. The tension is such that the post Q is forced normally away from the bolt I, and therefore withdraws the bell frame or lever D and the lever K away from the crank-arm C and the end *t* from contact with the striking means. The post 7 allows great elasticity when the lever K is in contact with the striking means, and the post 8 causes a rebound after the clapper strikes the bell. The striker has a hub in which is an aperture *y* to receive the end *b* of the axle of the pedal and is secured between the boss C′ and the shoulder *a*. One or more arms O may be employed, and when more than one there are preferably one or more arms O′ set over, so that the end barely forms a contact, and so that a subdued sound of the bell is produced, alternating with the loudest sound produced by contact with the arm O. Thus the monotonous tones of other bells are obviated, and a warning of greater effect is given. This effect is attained by reason of the positive frame-stops and the offset arms, as the straight arms O, which, however, may be offset in the opposite direction to the others, cause the lever end *t* to have a greater travel than do the others, as will be obvious.

The bell is operated by an extension connected with the bell frame or lever D, that extends up beside the foot when it is on the pedal-frame. Actuation of the bell frame or lever brings the clapper into engagement with the striker. The extension of said bell frame or lever to a place beside the foot may be either formed separately, as N, having a slot *u*, whereby it is adjustable, and a screw-bolt *v*, securing the same to a lug M of the frame and against a shoulder *w*, or as an integral arm M′, extending upward from the frame above the pedal-frame, so that it may be engaged by the rider's shoe-sole or the foot. In low-gear bicycles it may be desirable to dispense with the striker, as the lever K is equally adapted to act with the crank-arm C, the edge 10 being the contact side.

In operation, as will be apparent from the foregoing, the rider may press his foot sidewise against the extension N or M′ and cause the frame or lever D to swing on its pivot toward the crank-arm C, bringing the elements into operation, as explained in detail, and causing an alarm while so retained by the foot, the alarm ceasing when pressure against the extension is removed. The base is so situate that when the bell frame or lever is in the inoperative position the lever K clears the striker and is normally held, substantially as shown in Fig. 3, by the spring P resting against the post 8.

While the form of spring shown is simple and effective, obviously I may adopt equivalent separate springs without departing from the intent and purpose of my invention, and the arm M′ may be bent laterally to any suitable degree to suit a shoe having a broader toe than the extension shown is designed for.

Having thus described my invention, what I claim, and desire to secure by Letters Patent, is—

1. A bell mechanism including a bell-clapper, means for actuating the bell-clapper, and a movable plate on which the bell-clapper is pivotally mounted and whereby it is held out of or moved into engagement with the clapper-actuating means.

2. A bell mechanism including a bell-clapper, means for actuating the bell-clapper, a movable plate on which the bell-clapper is pivotally mounted and whereby it is held out of or moved into engagement with the clapper-actuating means, and a spring that holds said movable plate in such position that the clapper is out of engagement with said clapper-actuating means.

3. A bell mechanism including a bell-clapper, means for actuating said bell-clapper, a movable plate on which the bell-clapper is pivotally mounted and whereby it is held out of or moved into engagement with the clapper-actuating means, and a spring that holds said movable plate in such position that the clapper will not engage said actuating means and so connected with the clapper as to force it into engagement with the bell when said clapper is actuated.

4. The combination with a pedal-axle and pedal-frame of a bicycle, and a suitable striker, of a pivoted plate or lever that can be actuated by the foot, and a bell-clapper pivoted on said plate or lever whereby the clapper can be moved into engagement with the striker, and when actuated will ring the bell.

5. The combination with a pedal-axle and pedal-frame of a bicycle, of a base-plate secured to the pedal-frame, and a striker so mounted as to rotate with the pedal-axle, a plate or lever pivoted on said base-plate and extended to be operated by the foot, and a clapper pivoted on the lever whereby the clapper is brought into engagement with the striker, and when actuated will ring the bell.

6. The combination with the pedal-axle and pedal-frame of a bicycle, and a striker so mounted as to rotate with the pedal-axle, of a pivoted plate or lever that can be actuated by the foot, a clapper pivoted on the plate or lever whereby the clapper can be moved into engagement with the striker and when actuated will ring the bell, and a spring that holds the plate or lever in such position that the clapper will not engage the striker.

7. The combination with the pedal-axle and pedal-frame of a bicycle, and a suitable striker, of a pivoted plate or lever that can be actuated by the foot, a clapper pivoted on the plate or lever whereby the clapper can be moved into engagement with the striker and when actuated will ring the bell, and a spring that holds the plate or lever in such a position that the clapper will not engage the striker and that also tends to force the clapper against the bell.

8. A bicycle-pedal provided with a bell frame or lever pivoted substantially at one of its sides or eccentrically so that its body portion may swing laterally across the pedal and provided with a projecting arm whereby the bell frame or lever may be shifted laterally, a bell supported by the bell-frame, and a bell-clapper pivoted to the bell frame or lever and projecting toward the bicycle crank-arm.

9. A bicycle-pedal bell comprising a base, a bell frame or lever movably attached to the base and normally retained in inoperative position, a bell, a bell-clapper, and an arm attached to the bell frame or lever whereby the bell frame or lever may be shifted to bring the bell-clapper in operative position in connection with a striker carried by the bicycle crank-arm.

10. A bicycle-pedal provided with a bell-frame pivoted at one side or eccentrically so that its body portion may swing laterally across the bottom of the pedal and provided with an arm projecting above the pedal whereby the bell-frame may be shifted laterally, a bell supported by the bell-frame, a bell-clapper pivoted to the bell-frame and projecting toward the bicycle crank-arm, a spring for the bell-clapper, and a spring whereby the bell-frame is normally held from swinging toward the bicycle crank-arm.

11. A bicycle-pedal provided with a stationary base, a bell frame or lever pivoted at one side of the base so that the greater portion of the bell frame or lever may swing laterally toward the bicycle crank-arm, a spring whereby the bell frame or lever is normally held away from the bicycle crank-arm, an arm whereby the bell frame or lever may be pressed toward the bicycle crank-arm, a bell, a clapper pivoted to the bell frame or lever and projecting therefrom toward the bicycle crank-arm, and a spring for the clapper.

12. A bicycle-pedal bell comprising a base, a clamp whereby the same may be secured to the pedal-axle and provided at one end with a pivot-pin, a bell frame or lever connected to such pivot-pin and working parallel with the base and provided at the side opposite the pivot with a projecting arm adapted to be engaged by the foot of a bicycle-rider, a frame or lever spring, a bell, a bell-clapper lever having a clapper at one end thereof and pivoted to the bell-frame, a bell-clapper spring, and a striking-arm attachable to the bicycle crank-arm.

13. In a bicycle-pedal bell, the combination of the pedal, the base, the pivoted bell frame or lever, the bell, the operating-lever secured to the bell frame or lever and extending above the pedal whereby the bell-frame is shifted, the clapper-lever having a clapper on its inner end and pivoted to the bell frame or lever, and the strikers secured to the bicycle crank-arm and provided with alternating arms offset away from the clapper-lever whereby the same is engaged by such lever during a lesser period of time than are the remaining strikers.

14. In a bicycle-pedal bell, the combination of the pedal, the base F provided with the pivot *k* and the perforation *i*, the bell-frame D having the bell secured thereto and the protecting-flange *d* and slot *h* and mounted on said pivot, the clamp, the clamp-bolt below said slot, the posts, the clapper-lever K pivoted to said bell-frame and projecting therefrom, the striker secured to the pedal-axle, and the spring whereby the bell-frame and the clapper-lever are pressed, substantially as set forth.

15. In a bicycle-pedal bell, the combination of the pedal, the base, the bell frame or lever, the clapper-lever pivoted to the bell-frame and having a bell-clapper at its inner end and its outer end projecting from the bell frame or lever, the striker mounted on the bicycle crank-arm, the spring pressing the bell frame or lever oppositely from the bicycle crank-arm, the spring tending to hold the clapper elastically near the bell, and an arm attached to the bell frame or lever whereby the same may be shifted about its pivot so that said clapper-lever may form contact with the striker, substantially as set forth.

16. In a bicycle-pedal bell, the combination of the pedal, the bicycle crank-arm, the base, the bell frame or lever, the clapper-lever pivoted to the bell frame or lever and projecting toward the crank-arm, the operating-arm attached to the bell-frame, and the frame or lever spring, the clapper-lever spring, and the strikers carried by such crank-arm and situate in different planes whereby such clapper-lever is engaged and moved a greater distance about its pivot by the strikers nearest thereto than by such strikers in the plane farthest therefrom, substantially as and for the purposes set forth.

In witness whereof I have hereunto affixed my signature in the presence of the witnesses herein named.

HORACE Q. PLUMMER.

Witnesses:
M. C. BUCK,
V. H. LOCKWOOD.